United States Patent [19]

Nakane et al.

[11] Patent Number: 4,785,444

[45] Date of Patent: Nov. 15, 1988

[54] OPTICAL RECORDING DISC

[75] Inventors: Yasuaki Nakane; Kazumine Ito, both of Tokyo; Sanae Abe, Chiba; Takashi Naito, Kanagawa, all of Japan

[73] Assignee: Sony Corporation, Tokyo, Japan

[21] Appl. No.: 16,784

[22] Filed: Feb. 20, 1987

[30] Foreign Application Priority Data

Feb. 20, 1986 [JP] Japan ................. 61-035890

[51] Int. Cl.$^4$ .................. G11B 23/00; G11B 5/82; G11B 7/00
[52] U.S. Cl. ..................... 369/282; 360/135; 369/271; 369/290
[58] Field of Search ............... 369/280, 282, 289, 290, 369/270, 271, 283, 284, 286; 360/135

[56] References Cited

U.S. PATENT DOCUMENTS

| 4,504,842 | 3/1985 | Odawara | 369/284 |
| 4,616,278 | 10/1986 | Yamaguchi et al. | 369/282 |
| 4,644,520 | 2/1987 | Lange | 369/286 |
| 4,658,311 | 4/1987 | Sakaguchi | 369/270 |
| 4,680,655 | 7/1987 | Sugawara | 369/270 |
| 4,694,370 | 9/1987 | Ommori et al. | 360/135 |

Primary Examiner—Steven L. Stephan
Attorney, Agent, or Firm—Hill, Van Santen, Steadman & Simpson

[57] ABSTRACT

An optical recording disc in which a disc substrate made of a synthetic resin having a light transmittance and a hub made of a synthetic resin, fixed to a center part of the disc substrate by means of a predetermined technique such as a supersonic wave expansion molding and on which a circular magnetic metal plate is installed by means of an insert molding and so on are provided and a circular groove which is continuous at an outer peripheral side of a fixing part between the disc substrate and hub is furthermore installed on at least either of the disc substrate or hub. The groove is provided for absorbing a stress generated due to a difference in thermal expansion rates between the disc substrate made of the snythetic resin and magnetic metal plate.

43 Claims, 11 Drawing Sheets

OPTICAL RECORDING DISC

BACKGROUND OF THE INVENTION

The present invention relates to an optical recording disc on which an information is optically recorded and/or reproduced.

The present invention relates particularly to an optical recording disc which can reduce a size of an optical recording/reproducing apparatus using the optical recording disc and can provide a more accurate information recording and reproduction with a strain generated in a disc main body extremely reduced.

In an information recording disc drive apparatus which carries out a record/reproduction of information with an information recording disc such as a random access type optical disc or a magneto-optical disc, a turn table is usually rotated at an extremely high speed. Therefore, a slip between the turn table and information recording disc will occur in such a case that the information recording disc is merely mounted on the turn table.

In order to prevent the occurrence of slip, a transferable chuck member is installed which grasps the information recording disc with the turn table when it is moved in a direction of the rotation axle of the turn table so that the information recording disc is firmly grasped.

However, if the transferable chuck member is installed, a space for a movement stroke of the transferable chuck member must be provided in a thickness direction of the information recording disc drive apparatus. Therefore, the information recording disc drive apparatus cannot sufficiently be miniaturized.

In order to prevent the occurrence of slip and reduce a size of the information recording disc drive apparatus, such an information recording disc drive apparatus has been proposed that a magnetic circular plate is fixed on the information recording disc and the magnetic circular plate is magnetically attracted to the turn table to hold the information recording disc.

Figure 1:
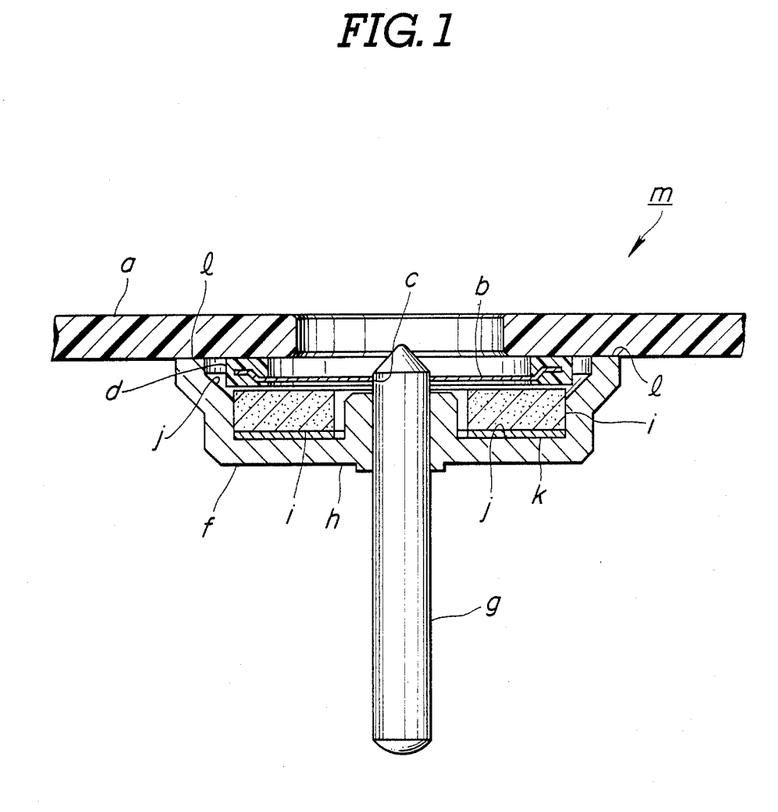
FIG. 1 is a cross sectional view of a previously proposed turn table on which an information recording disc is mounted.
Figure 2:
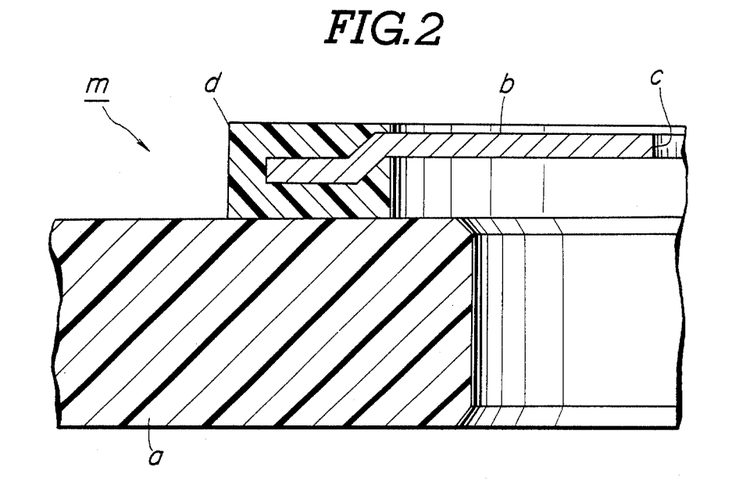
FIG. 2 is an enlarged sectional view of an essential part of the turn table shown in FIG. 1.
Figure 3:
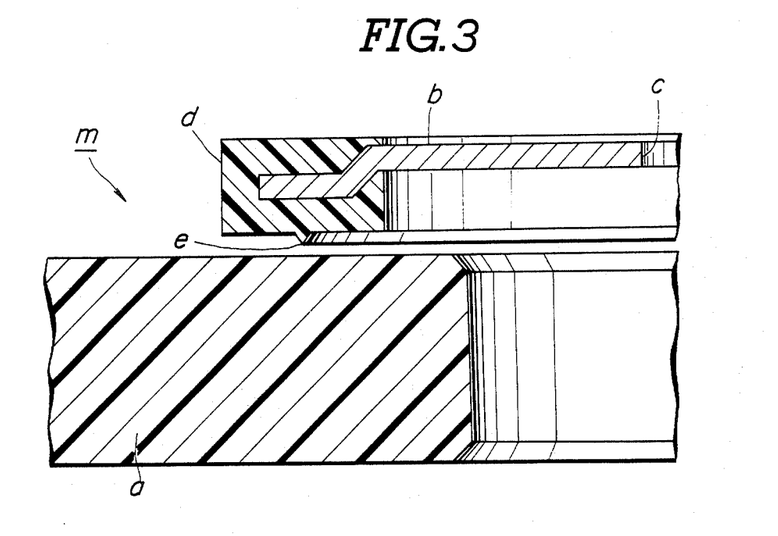
FIG. 3 is a further enlarged sectional view of the essential part shown in FIG. 2.

FIGS. 1 through 3 show a turn table for the information recording disc having the construction described above.

An information recording disc generally denoted by m comprises a disc main body a including a substrate formed of a thermoplastic synthetic resin on which a predetermined record layer and its protective layer are formed. The information recording disc is, for example, an optical disc.

Located below the information recording disc main body a is a magnetic circular plate b having a centering hole c penetrated therethrough at a center part of the magnetic circular plate b. The magnetic circular plate b is made of a magnetic material and is formed in a circular shape. A hub d is integrally formed with the magnetic circular plate b along an outer peripheral edge thereof. The hub d is circular and is made of a thermoplastic synthetic resin, preferably of the same material as the information recording disc main body a or the same series material. An expansion molding rib e is projected on an upper surface of the hub d.

The hub d is fixed to a lower surface of the information recording disc main body a by means of a supersonic wave expansion molding so that the magnetic circular plate b is fixed to a lower surface of the information recording disc main body a via the hub d. It is noted that the centering hole c formed so as to penetrate through the magnetic circular plate b is positioned so as to match with the center of the information recording disc main body a.

A turn table generally denoted by f includes: a drive shaft g; a thick main body part h fixed around an upper end of the drive shaft g; and a magnet fixed to the thick main body part h.

The turn table f is rotatable by means of a suitble drive mechanism and an upper end thereof is formed in a rounded circular truncated cone shape. In addition, a circular recess j is formed on an upper surface of the turn table main body part h. A circular yoke plate k and circular magnet i are housed in this order and fixed to the circular recess j. Furthermore, a disc receiving surface λ is formed at an outside of the recess j and has an inner diameter larger than an outer diameter of the hub d.

When the information recording disc m is mounted on the turn table f, the magnetic circular plate b attached to the information recording disc m is attracted to the magnet i of the turn table f, so that the upper end of the drive shaft g becomes engaged with the centering hole c provided through the magnetic circular plate b and a lower surfac at the outside of the hub d of the information recording disc m is mounted on the disc receiving surface λ.

Hence, the centering of the information recording disc m is carried out when the upper end of the drive shaft g is engaged with the centering hole c of the magnetic circular plate. In addition, a record/reproduction positioning of the information recording disc is carried out by receiving the lower surface at the outside of the hub d of the information recording disc m.

Since in the turn table f described above, such a member as the transferable chuck member described above which grasps the information recording disc when it is moved in the thickness direction of the information recording disc in order to securely hold the information recording disc main body a is not required, the size of the information recording disc drive apparatus, especially, the size thereof in its thickness direction can accordingly be reduced.

However, such a problem arises that a strain will occur in the substrate of the information recording disc m described above so that an inaccurate record/read of information will result.

That is to say, since the hub d which holds the magnetic circular plate b is fixed to the disc main body a by means of the thermal expansion molding, a stress is imposed on the substrate of the disc main body a and causes the generation of stress on the substrate. In addition, in an information record/playback apparatus using such an information recording disc, a temperature within the apparatus reaches as high as 50° C. or more during operation so that a temperature difference from a normal temperature becomes 20° C. or more. Consequently, a stress in a tensile direction (tensile stress) is imposed on the center part of the substrate of the disc main body due to the difference in thermal expansion rates between the substrate of the information recording disc and magnetic circular plate. On the other hand, a stress in a compressive direction (compressive stress) is imposed on a part outside of a part of the disc main body at which the hub d is fixed to the substrate of the disc main body by means of an expansion molding.

Furthermore, if the information recording disc m is a magneto-optical disc, the above-described stresses cause a birefrigence and therefore reduces a property of the optical recording disc. Particularly, since a minute rotation of a polarized surface of light is read as a signal in a case of a magneto-optical disc recording system, the birefrigence makes the signal quality remarkably deteriorated. In addition, since a light elastic modulus of a polycarbonate resin is large in a case when the polycarbonate resin is used as the material of the disc substrate, the increase rate in the birefrigence is large due to the temperature difference described above as compared with an acrylic resin or glass which is used as the material of the substrate of the disc main body. Specifically, the increase rate of the birefrigence value is 40 nm or more. Consequently, it is impractical.

Figure 13A:
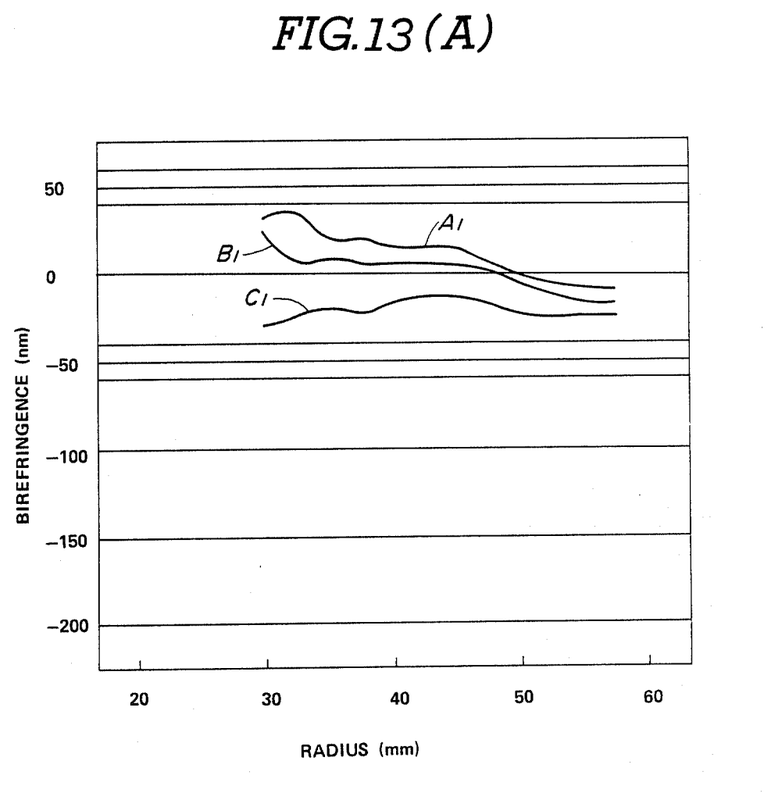
FIGS. 13(A) through 13(C) are characteristic graphs representing birefrigence with respect to each position of the optical recording discs in their radial directions.
Figure 13B:
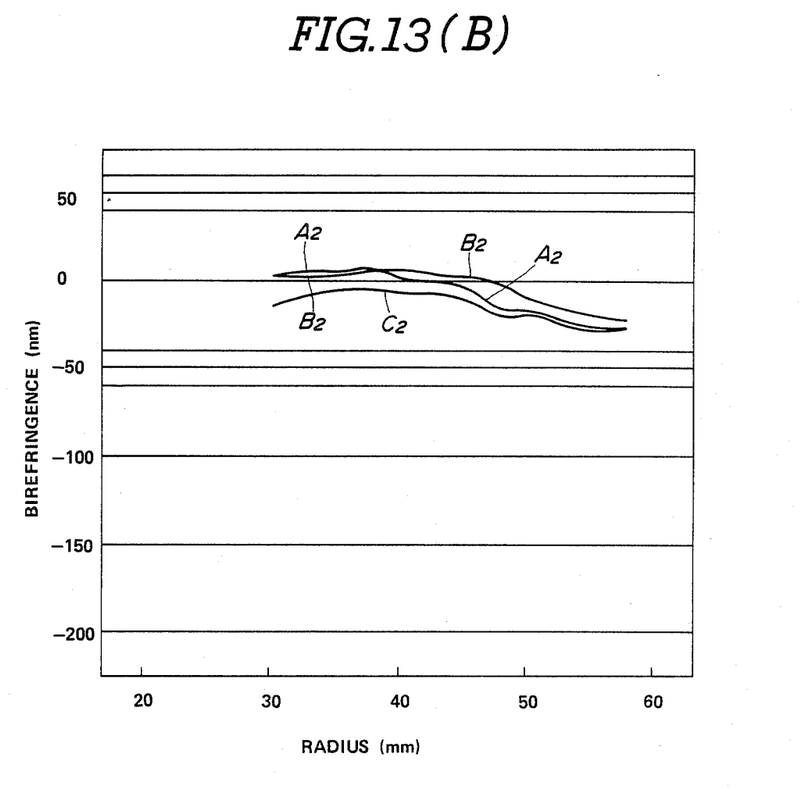
Figure 13C:
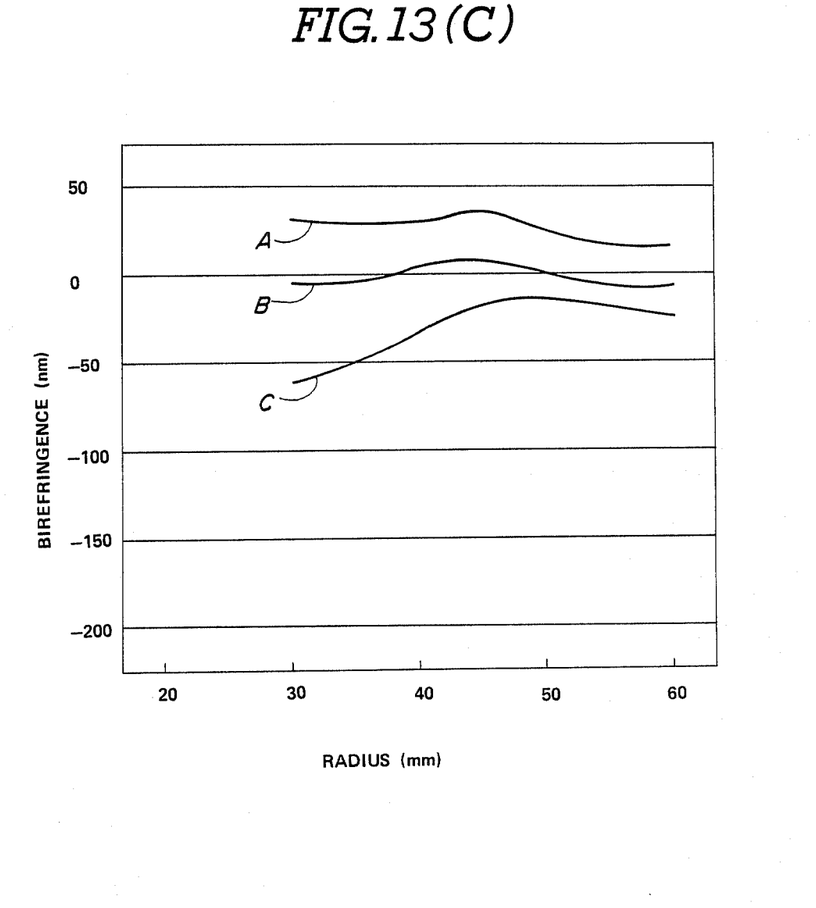

FIG. 13(C) is a graph representing the birefrigence in the above-described information recording disc. A vertical axis in FIG. 13(C) denotes the birefrigence in a unit of nm when a laser beam is reciprocated and a horizontal axis therein denotes a distance in a unit of mm from the center of the information recording disc m in a radial direction. A curve A represents the birefrigence of the disc main body a before the hub d is fixed to the substrate by means of the thermal expansion molding, a curve B represents the birefrigence thereof after the hub d is fixed to the disc main body by means of the thermal expansion molding at an ambient temperature of 20° C., and a curve C represents the birefrigence of the disc main body a when the hub is fixed to the disc main body by means of the thermal expansion molding and thereafter the ambient temperature is increased to 50° C., respectively. It is noted that the information recording disc used to obtain measured values shown in FIG. 13(C) includes: the substrate made of the polycarbonate resin having the thickness of 1.2 mm and outer diameter of 130 mm; the hub made of the polycarbonate resin having the outer diameter of 32 mm and the thickness of 2 mm; and the magnetic circular plate made of a magnetic stainless SUS 430 having the thickness of 0.5 mm and which is press punched. In addition, in FIG. 13(C) a direction of minus sign (—) denotes a direction of the birefrigence generated due to the radial directional stress.

As appreciated from FIG. 13(C), the birefrigence is changed about 100 nm from the curve A to the curve B at a position 30 mm away in the radial direction from the center of the most inner periphery of a record area of the information recording disc. These measurement results show that the information recording disc drive apparatus having the turn table and the information recording disc described above cannot almost be reduced in a practical use.

SUMMARY OF THE INVENTION

With the above-described problem in mind, it is an object of the present invention to provide an optical recording disc which enables a miniaturization of a disc holding part in an information record/reproducing apparatus and enables an accurate record/reproduction of an information on the optical recording disc with a strain generated on the disc remarkably reduced.

The above-described object can be achieved by providing an optical recording disc on which information is optically recorded or reproduced, the optical recording disc comprising: (a) a disc substrate made of a synthetic resin and having a light transmittance; (b) a hub fixed to a substantially center part of the disc substrate and having a magnetic metal plate; and (c) a groove for absorbing a stress imposed on the optical recording disc and generated due to a difference in thermal expansion rates between the disc substrate made of the synthetic resin and magnetic metal plate, which is located at least at a periphery outside of a part at which the disc substrate and hub are fixed together and is extended on at least either of the disc substrate or hub.

The above-described object can be achieved by providing a magneto-optical disc, comprising: (a) a disc substrate made of a synthetic resin material and having a light transmittance; (b) a magnetic metal plate in a ring shape installed on the disc substrate; (c) a hub made of a synthetic resin having the similar characteristic as the disc substrate and fixed to the center part of the disc substrate by means of a thermal expansion molding; and (d) grooves each in a ring shape provided on both peripheral sides inside and outside of a part at which the disc substrate and hub are fixed together and provided on both opposing surfaces of the disc substrate and hub.

DETAILED DESCRIPTION OF THE PREFERRED EMBODIMENTS

Reference will hereinafter be made to the drawings in order to facilitate understanding the present invention. The previously proposed optical recording disc has been described with reference to FIGS. 1 through 3 and FIG. 13(C).

(1) First Preferred Embodiment [FIGS. 4 through 8 and FIG. 13(A)]

FIGS. 4 through 8 show a first preferred embodiment of an optical recording disc according to the present invention which is applicable to a magneto-optical disc.

Figure 4:
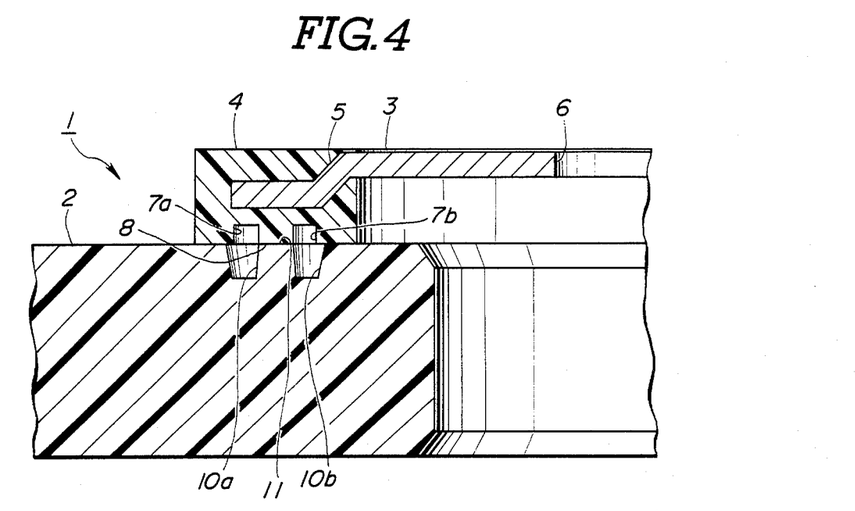
FIG. 4 is an enlarged cross sectional view of an essential part in a first preferred embodiment of an optical recording disc according to the present invention.
Figure 5:
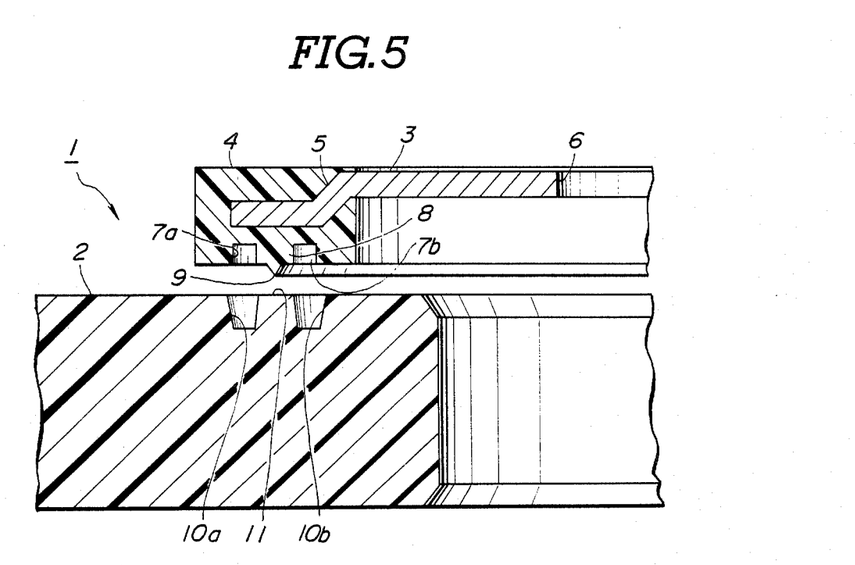
FIG. 5 is a further enlarged cross sectional view of the essential part shown in FIG. 4.

The magneto-optical recording disc 1 includes a disc main body 2, a magnetic circular plate 3, and a hub 4.

a. Disc Main Body

The disc main body 2 includes a substrate having a construction in which a synthetic resin, e.g., polycarbonate resin is molded and formed in a circular plate shape, on a flat surface of which an information signal record layer is provided on which a record of information signal is carried out by means of a magneto-optical system utilizing a laser beam and a protective layer made of a synthetic resin is laminated on the record layer.

b. Magnetic Circular Plate

The magnetic circular plate 3 is made of a magnetic material, for example, an iron plate on which a chromium plating is carried out or a magnetic stainless plate. The reason of carrying out the chromium plating on the iron plate is to provide an antirot property for the magnetic circular plate 3. In a case when the stainless steel plate is used, it is preferable to use a magnetic stainless SUS 430, etc. Such an original plate made of the magnetic material as described above is formed in the circular shape by means of a press punching. At the same time, a folding part 5 is formed, a peripheral edge of which is bent in a substantially letter Z shape to form a folding part 5. In FIGS. 4 and 5, a centering hole 6 is provided at a center of the magnetic circular plate 3.

c. Hub

The hub 4 is formed of a synthetic resin. The synthetic resin forming the hub 4 is preferably the same series as that forming the substrate of the disc main body 2. For example, the material of the hub 4 may also be of a polycarbonate resin when the polycarbonate resin is used as the material of the disc main body substrate. The hub 4 is formed substantially in a ring shape. The hub 4 is integrally attached to a peripheral edge of the magnetic circular plate 3 by means of an insert molding. At this time, the folding part 5 formed on the peripheral edge of the magnetic circular plate 3 is burried into the hub 4 so that the magnetic circular plate 3 is securely coupled to the hub 4.

d. Coupling Part Between the Disc Main Body and Hub

A couple of grooves 7a, 7b are concentrically formed with respect to a center of the hub 4 and are opposed to an upper surface of the disc main body 2. A fixing part 8 is left between the couple of grooves 7a, 7b. A rib 9 in a triangular shape of section is formed substantially along a center line of the fixing part 8 of the hub 4. The rib 9 is provided by means of an expansion molding.

It is noted that a couple of grooves 10a, 10b are concentrically formed on an upper surface facing the hub 4 with respect to a center of the disc main body 2. A fixing part 11 is left on a part between the couple of grooves 10a, 10b. The fixing part 11 is formed at a position facing the fixing part 8 of the hub 4 when the center of the hub 4 is overlapped on that of the disc main body 2. It is noted that the rib 9 may be formed on the disc main body 2 in place of the hub 4.

e. Fixing of the Hub to Disc Main Body

Figure 6:
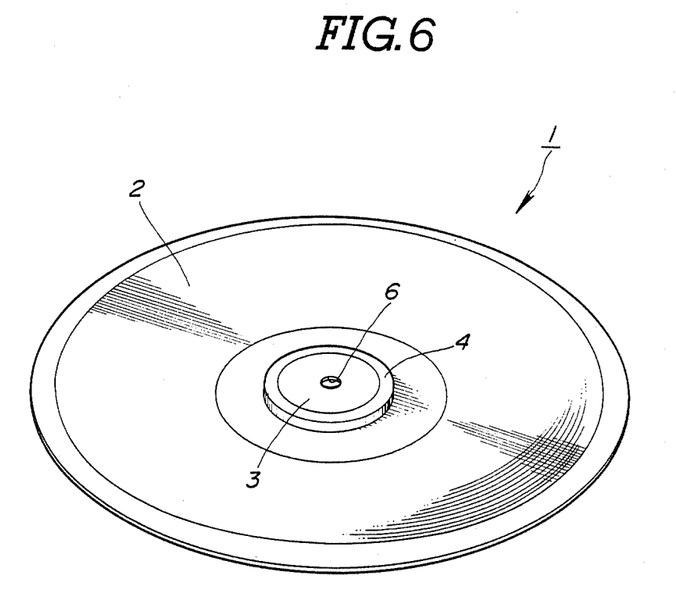
FIG. 6 is a perspective view of the optical recording disc shown in FIGS. 4 and 5.
Figure 7A:
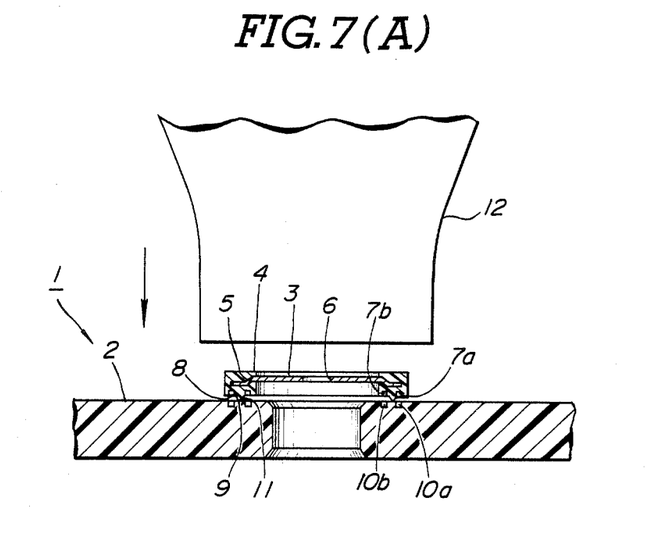
FIGS. 7(A) and 7(B) are cross sectional views for explaining a sequence in which a hub holding a magnetic metal plate is fixed to a disc main body by means of a thermal expansion molding.
Figure 7B:
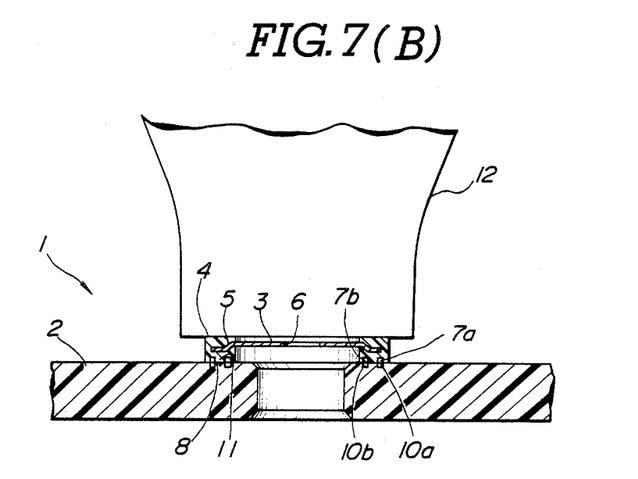
Figure 8:
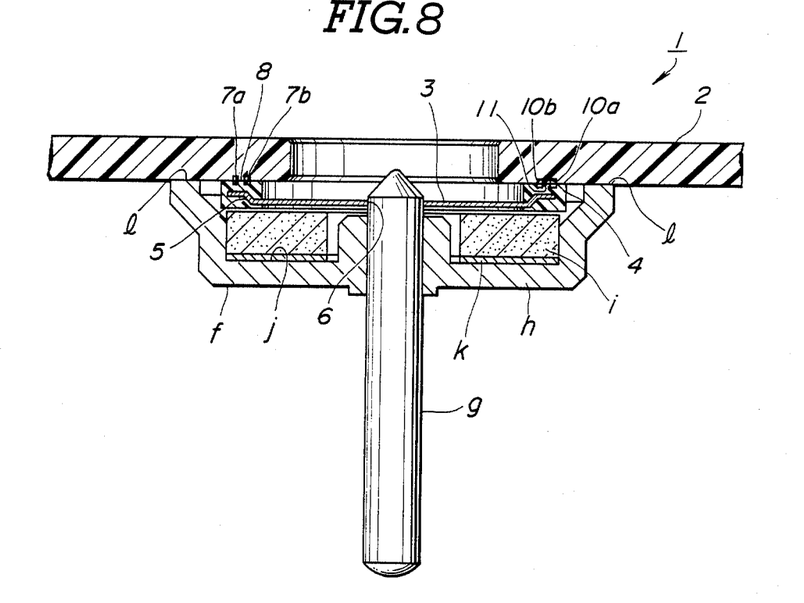
FIG. 8 is an enlarged cross sectional view of the optical recording disc which is mounted on the turn table.

The hub 4 holding the magnetic circular plate 3 is mounted on the disc main body 2 so that the fixing parts 8 and 11 are overlapped, as shown in FIG. 6. As shown in FIGS. 7(A) and 7(B), a supersonic wave horn 12 is pneumatically pressed against the hub 4. A supersonic wave vibration is applied for a predetermined period of time, e.g., for 0.1 through 0.5 seconds through the supersonic wave horn 12.

A heat generated due to the application of the supersonic wave vibration between the mutual fixing parts 8, 11 of the disc main body 2 and hub 4 causes the rib 9 to be thermally melted so that both fixing parts are thermally molded and fixed together. It should be noted that an extra amount of the melted resin flows into either of the couple of grooves 7a, 7b or 10a, 10b. Consequently, a surface accuracy between the disc main body 2 and hub 4 will not be reduced. In addition, since the transmission of heat when the thermal expansion molding for the fixing parts is carried out is interrupted by the couple of grooves 10a, 10b, the heat will not be transmitted over the surface of the substrate and strain due to the heat will not occur in the substrate.

In this way, the magneto-optical disc generally denoted by 1 is formed.

Therefore, when the magneto-optical disc 1 is used, the ambient temperature rises, and a difference in the thermal expansion rate between those of the substrate of the disc main body 2 and magnetic circular plate 3 exists, the stress generated due to the difference described above is remarkably reduced by elasticity provided for the fixing parts 8, 11 formed between the couples of grooves 7a, 7b, 10a, 10b. In addition, the increase rate of birefrigence generated on the substrate generated on the disc main body 2 is extremely reduced. FIG. 13(A) shows a graph representing the birefrigence in the magneto-optical disc 1 in the first preferred embodiment. This graph is prepared in the same procedure as that in FIG. 13(C). A curve $A_1$ represents the birefrigence of the disc main body 2 before the hub 4 is thermally fixed to the disc main body 2, a curve $B_1$ represents the birefrigence of the disc main body after the hub 4 is thermally fixed to the disc main body 2 at the ambient temperature of 20° C., and a curve $C_1$ represents the birefrigence of the disc main body 2 when the hub 4 is thermally fixed to the disc main body 2 and thereafter the ambient temperature is increased to 50° C.

The magneto-optical disc 1 used to obtain measured values shown in FIG. 13(A) has the substrate of the disc main body 2 made of the polycarbonate resin molded article and having a thickness of 2 mm and outer diameter of 130 mm, hub 4 made of the polycarbonate resin molded article and having the outer diameter of 32 mm and the thickness of 2 mm, and the magnetic circular plate made of the magnetic stainless, having the thickness of 0.5 mm and which is press punched. As appreciated from FIG. 13(A), the change in the birefrigence becomes extremely small as compared with that shown in FIG. 10(C). The maximum value of birefrigence is not more than 40 nm. No practical problem arises.

Figure 9:
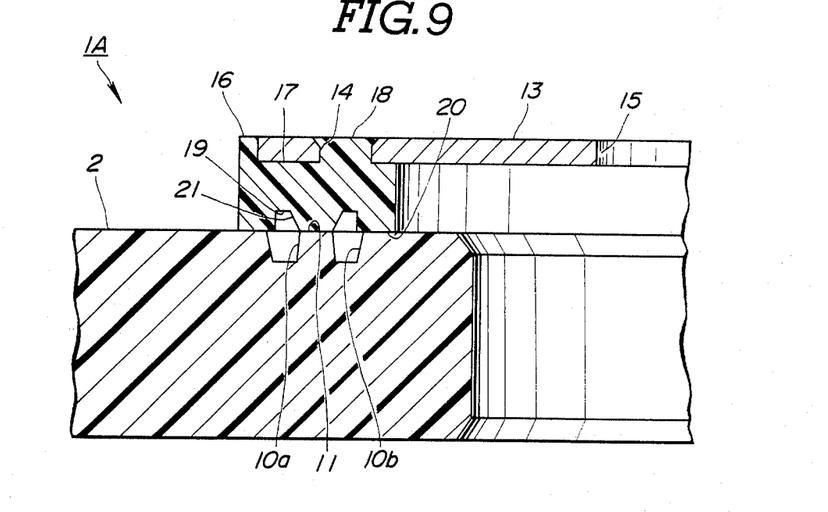
FIG. 9 is an enlarged cross sectional view of the optical recording disc in a second preferred embodiment according to the present invention.
Figure 10:
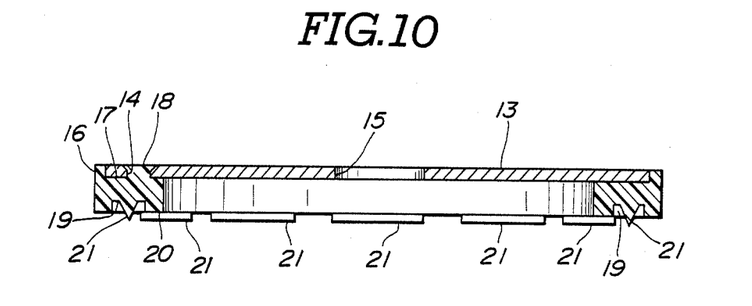
FIG. 10 is a longitudinally sectioned view of a hub holding a magnetic metal plate in the second preferred embodiment shown in FIG. 9.
Figure 11:
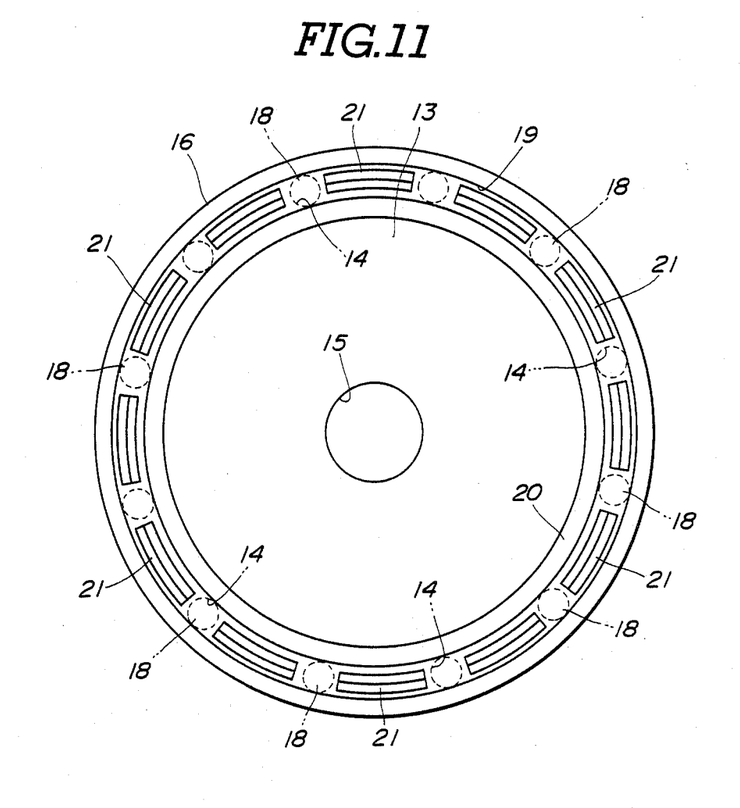
FIG. 11 is a side view of the optical recording disc and hub shown in FIGS. 9 and 10.

(2) Second Preferred Embodiment [FIGS. 9 through 11]

FIGS. 9 through 11 show a second preferred embodiment of the optical recording disc according to the present invention.

The optical recording disc 1A in the second preferred embodiment is different from that in the first preferred embodiment in the structures of the magnetic circular plate and hub. The other parts are the same as those in the first preferred embodiment. Therefore, the detailed descriptions of the same elements are omitted here. The same reference numerals designate the corresponding elements in the first preferred embodiment.

a. Magnetic Circular Plate

In FIGS. 9 through 11, numeral 13 denotes the magnetic circular plate. The magnetic circular plate 13 is formed of a plate member made of a magnetic material which is press punched. A peripheral edge thereof is provided with a plurality of mounting holes 14, 14, . . . Each upper surface of the mounting holes 14, 14, . . ., which is an opposite side of the disc main body 2 becomes wider than each bottom surface thereof in a dish hole configuration. It is noted that numeral 15 denotes a centering hole penetrated through a center part of the magnetic circular plate 13.

b. Hub

The hub 16 is made of the synthetic resin. The synthetic resin constituting the hub 16 preferably belongs to the same series as that used for the disc substrate. For example, the polycarbonate resin is preferable.

The hub 16 is circularly formed. A shallow recess 17 is formed with an outer periphery left on the surface opposite to the disc main body surface. The outer edge part of the magnetic circular plate 13 is fitted into the recess 17. A plurality of projections 18, 18, . . . are fitted into the mounting holes 14, 14, . . . of the magnetic circular plate 13, so that the magnetic circular plate 13 is coupled to the hub 16.

The magnetic circular plate 13 is coupled to the hub 16 in such a way that an injection molding for the hub 16 may be carried out with the outer edge part of the magnetic circular plate 13 inserted within a molding die. After molding of the hub 16 only, the projections 18, 18, . . . of the hub 16 are inserted into the mounting holes 14, 14, . . . of the magnetic circular plate 13, and tips of the projections 18, 18, . . ., are staked. Since in this coupling state the tips of the projections 18, 18, . . . of the hub 16 are expanded and raised laterally so as to engage with the dish hole parts of the mounting holes 14, 14, . . ., the magnetic circular plate 13 can securely be coupled to the hub 16.

A circular groove 19 is formed substantially along the center line of the surface 20 opposing the disc main body 2. A plurality of fixing parts 21, 21, . . . are formed in a rib configuration which are triangles in cross sections so as to align with a circle substantially along the center line. The tip ends of these fixing parts 21, 21, . . ., are slightly projected from the above-described surface 20. These fixing parts 21, 21, . . ., described above serve as the rib provided in the first preferred embodiment.

c. Information Recording Disc

The fixing parts 18, 18, . . . of the hub 16 which holds the magnetic circular plate 13 described above are coupled to the fixing parts 11, 11, . . . by means of a supersonic wave expansion molding. Consequently, the hub 16 is coupled to the disc main body 2 and the magneto-optical disc 1A is formed. The information recording disc as the magneto-optical disc 1A is completed which has the same effect as that in the first preferred embodiment.

It should be noted that since a drawing is not required on its outer edge portion of the magnetic circular plate 13 in the second preferred embodiment, the cost is accordingly reduced. Since the surface of the turn table f opposing the magnet i can be increased for the diameter of the magnetic circular plate 13, the diameter of the magnetic circular plate 13 can be reduced to achieve the same holding force as compared with that of the second preferred embodiment. Hence, the diameter of the magnetic circular plate 13 can be reduced. The outer diameter of the hub 13 can accordingly be reduced. This makes possible the coupling part between the hub 16 and disc main body 2 nearer to the center of the disc main body. Therefore, an influence of the birefringence on the record area can accordingly be reduced.

For example, in a case when the outer diameter of the hub 16 in the first preferred embodiment is 32 mm, the hub 16 in the second preferred embodiment can have the same suction and attaching force as that in the first preferred embodiment even if the outer diameter thereof is 25 mm.

FIG. 13(B) shows a graph representing the birefrigence with respect to the radial direction of the information recording disc 1A of the second preferred embodiment. This graph is prepared in the same manner as that of FIG. 13(C). A curve $A_2$ represents the birefrigence of the disc main body before the hub 16 is thermally melted and fixed to the disc main body 2. A curve $B_2$ represents the birefrigence of the disc main body 2 after the hub 16 is thermally melted and fixed to the disc main body at the ambient temperature of 20° C. A curve $C_2$ represents the birefrigence when the hub 16 is thermally melted and fixed to the disc main body and thereafter the ambient temperature is increased to 50° C. It should be noted that the information recording disc used for the birefrigence measurement whose result is shown in FIG. 13(B) has the same construction as those used in the birefrigence measurements carried out with reference to FIGS. 13(A) and 13(C).

As appreciated from FIG. 13(C) the change rate of birefrigence is remarkably reduced as compared with that shown in FIG. 13(C). Furthermore, it is smaller than that in the first preferred embodiment.

Figure 12:
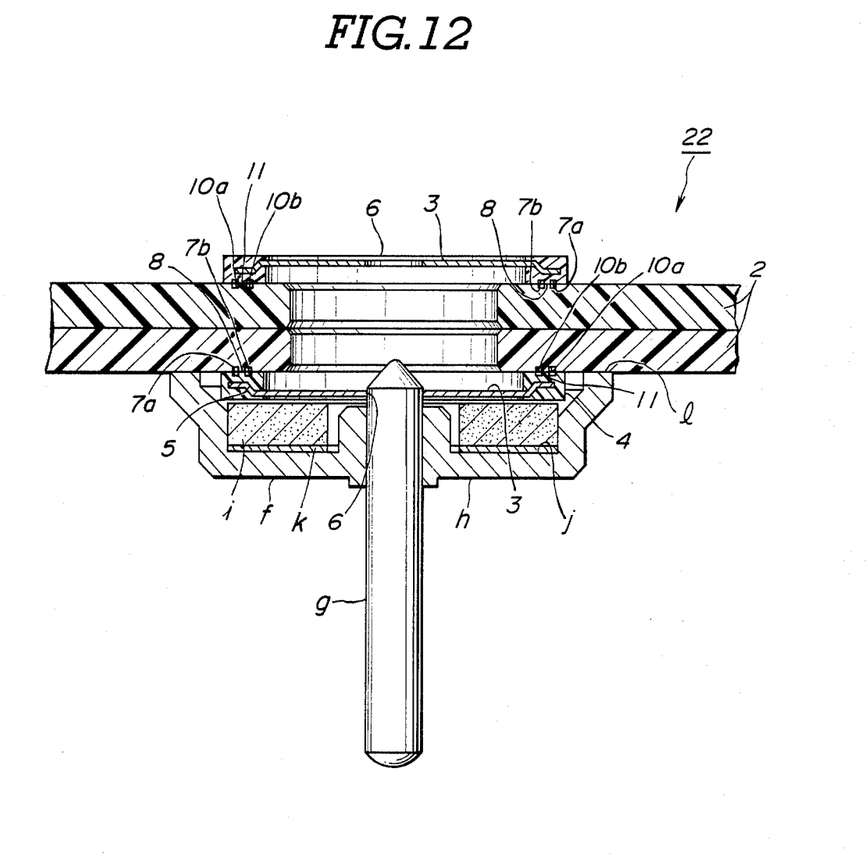
FIG. 12 is a rough cross sectional view of a modification of the optical recording disc.

(3) Modification [FIG. 12]

FIG. 12 shows a rough sketch of a modification of the optical recording disc according to the present invention. The modification shown in FIG. 12 is such that two pieces of information recording discs are adhered back to back so that a memory capacity thereof can be doubled. It is noted that the two optical recording discs may be those in the first preferred embodiment or may be those in the second preferred embodiment. As described hereinabove, the optical recording disc according to the present invention can reduce the size of the information record/reproduction apparatus particularly a disc holding part. In addition, the couple of grooves are provided on least one of the disc main body and hub so that the stress imposed on the disc main body generated due to the difference in the thermal expansion rates between the disc main body and magnetic metal plate is almost cancelled through the couple of grooves. Consequently, a strain generated in the disc main body can be reduced so that an accurate record and reproduction for the optical recording disc can be achieved.

It is noted that although in each preferred embodiment the groove may be formed on each or either of the disc main body or hub. It is also noted that although the couple of grooves are formed in the complete circular configuration in each preferred embodiment, it is sufficient that the groove(s) may be formed so as to correspond to both disc main body and hub.

Although in the case where the shape of each fixing part is triangle in section as shown in the second preferred embodiment, inclined angles of both or either inner oblique surface of the triangular fixing point or outer oblique surface thereof may be changed so that a position at which the fixing parts are fixed together can be moved toward a more inner periphery or more outer periphery during the supersonic wave expansion molding. This movement permits the adjustment of the stress after the thermal expansion molding is carried out. For example, if the inclined angle of the inner peripheral side oblique surface becomes larger and that of the outer peripheral side oblique surface becomes smaller, it becomes possible to impose a slight stress on a direction toward which the hub depresses the disc main body substrate outwardly after the thermal expansion molding is carried out. This makes possible the adjustment of the tensile stress generated on the hub and imposed on the disc substrate due to the increase in the ambient temperature.

It will fully be understood by those skilled in the art that the foregoing description is made in terms of the preferred embodiments and various modifications may be made without departing from the scope of the present invention which is to be defined by the appended claims.

What is claimed is:

1. An optical recording disc on which information is optically recorded or reproduced, the optical recording disc comprising:
   (a) a disc substrate made of a synthetic resin and having a light transmittance;
   (b) a hub fixed to a substantially center part of the disc substrate and having a magnetic metal plate; and
   (c) a groove for absorbing a stress imposed on the optical recording disc and generated due to a difference in thermal expansion rates between the disc substrate made of the synthetic resin and magnetic metal plate, which is located at least at a periphery outside of a part at which the disc substrate and hub are fixed together and is extended on at least either of the disc substrate or hub.

2. The optical recording disc as set forth in claim 1, wherein the hub is made of a synthetic resin material at least having the substantially same thermal expansion rate as the disc substrate.

3. The optical recording disc as set forth in claim 1, wherein the hub is made of the same synthetic resin as the disc substrate.

4. The optical recording disc as set forth in claim 3, wherein both magnetic metal plate and hub are substantially circular.

5. The optical recording disc as set forth in claim 4, wherein the groove is formed continuously.

6. The optical recording disc as set forth in claim 5, wherein the groove is mounted on the disc substrate.

7. The optical recording disc as set forth in claim 6, wherein the groove is installed on both sides of the outer and inner peripheries of the fixing part of the disc substrate.

8. The optical recording disc as set forth in claim 5, wherein the groove is installed on the hub.

9. The optical recording disc as set forth in claim 8, wherein the groove is installed on both sides of the outer and inner peripheries of the fixing part of the disc substrate.

10. The optical recording disc as set forth in claim 3, wherein the groove is formed intermittently.

11. The optical recording disc as set forth in claim 3, wherein the groove is installed on both of the disc substrate and hub.

12. The optical recording disc as set forth in claim 11, wherein the groove is installed on both sides of the outer and inner peripheries of the fixing part.

13. The optical recording disc as set forth in claim 12, wherein the magnetic metal plate is installed on the hub by an insert molding method.

14. The optical recording disc as set forth in claim 13, wherein a plurality of holes are installed through the magnetic metal plate, a projection is installed on the hub and is inserted into the holes, and the projection is then staked so that the magnetic metal plate is attached to the hub.

15. The optical recording disc as set forth in claim 13, wherein the hub is fixed to the disc substrate by means of a thermal expansion molding.

16. The optical recording disc as set forth in claim 13, wherein the hub is fixed to the disc substrate by means of a supersonic wave expansion molding.

17. The optical recording disc as set forth in claim 14, wherein the hub is fixed to the disc substrate by means of a thermal expansion molding.

18. The optical recording disc as set forth in claim 14, wherein the hub is fixed to the disc substrate by means of a supersonic expansion molding.

19. The optical recording disc as set forth in claim 8, wherein the magnetic metal plate is installed on the hub in an insert molding method.

20. The optical recording disc as set forth in claim 8, wherein a plurality of holes are installed on the magnetic metal plate, a projection is installed on the hub, the projection being inserted in the holes and the projection being staked so that the magnetic metal plate is attached to the hub.

21. The optical recording disc as set forth in claim 19, wherein the hub is fixed to the disc substrate by means of a thermal expansion molding.

22. The optical recording disc as set forth in claim 19, wherein the hub is fixed to the disc substrate by means of a supersonic wave expansion molding.

23. The optical recording disc as set forth in claim 20, wherein the hub is fixed to the disc substrate by means of a thermal expansion molding.

24. The optical recording disc as set forth in claim 20, wherein the hub is fixed to the disc substrate by means of a supersonic wave expansion.

25. The optical recording disc as set forth in claim 9, wherein the magnetic metal plate is installed on the hub by means of an insert molding.

26. The optical recording disc as set forth in claim 9, wherein a plurality of holes are installed through the magnetic metal plate and a projection is installed on the hub, the projection being inserted through the holes and the projection being staked so that the magnetic metal plate is mounted on the hub.

27. The optical recording disc as set forth in claim 25, wherein the hub is fixed to the disc substrate by means of a thermal expansion.

28. The optical recording disc as set forth in claim 25, wherein the hub is fixed to the disc substrate by means of a supersonic wave expansion molding.

29. The optical recording disc as set forth in claim 26, wherein the hub is fixed to the disc substrate by means of a thermal expansion molding.

30. The optical recording disc as set forth in claim 26, wherein the hub is fixed to the disc substrate by means of a supersonic wave expansion molding.

31. The optical recording disc as set forth in claim 6, wherein the magnetic metal plate is installed on the hub by means of an insert molding.

32. The optical recording disc as set forth in claim 6, wherein a plurality of holes are installed through the magnetic metal plate and the projection is inserted through the holes, the projection being staked so that the magnetic metal plate is attached to the hub.

33. The optical recording disc as set forth in claim 31, wherein the hub is fixed to the disc substrate by means of a thermal expansion molding.

34. The optical recording disc as set forth in claim 31, wherein the hub is fixed to the disc substrate by means of a supersonic wave expansion molding.

35. The optical recording disc as set forth in claim 32, wherein the hub is fixed to the disc substrate by means of a thermal expansion molding.

36. The optical recording disc as set forth in claim 32, wherein the hub is fixed to the disc substrate by means of a supersonic wave expansion molding.

37. The optical recording disc as set forth in claim 7, wherein the magnetic metal plate is installed on the hub by means of an insert molding.

38. The optical recording disc as set forth in claim 7, wherein a plurality of holes are installed on the magnetic metal plate and a projection is installed on the hub, the projection being installed through the holes and the projection being staked so that the magnetic metal plate is attached to the hub.

39. The optical recording disc as set forth in claim 37, wherein the hub is fixed to the disc substrate by means of a thermal expansion molding.

40. The optical recording disc as set forth in claim 37 wherein the hub is fixed to the disc substrate by means of a supersonic wave expansion molding.

41. The optical recording disc as set forth in claim 38, wherein the hub is fixed to the disc substrate by means of a thermal expansion molding.

42. The optical recording disc as set forth in claim 38, wherein the hub is fixed to the disc substrate by means of a supersonic wave expansion molding.

43. A magneto-optical disc, comprising:
(a) a disc substrate made of a synthetic resin material and having a light transmittance;
(b) a magnetic metal plate in a ring shape installed on the disc substrate;
(c) a hub made of a synthetic resin having the similar characteristic as the disc substrate and fixed to the center part of the disc substrate by means of a thermal expansion molding; and
(d) grooves each in a ring shape provided on both peripheral sides inside and outside of a part at which the disc substrate and hub are fixed together and provided on both opposing surfaces of the disc substrate and hub.

* * * * *